(12) United States Patent
Chen

(10) Patent No.: US 7,522,216 B2
(45) Date of Patent: Apr. 21, 2009

(54) VIDEO SYNCHRONIZATION SIGNAL DETECTION CIRCUIT

(75) Inventor: Dongwei Chen, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 669 days.

(21) Appl. No.: 11/162,706

(22) Filed: Sep. 20, 2005

(65) Prior Publication Data

US 2007/0064152 A1 Mar. 22, 2007

(51) Int. Cl.
*H04N 5/06* (2006.01)
*H04N 5/08* (2006.01)

(52) U.S. Cl. .................. 348/521; 348/516; 348/542; 348/525; 348/194

(58) Field of Classification Search .......... 348/521, 348/525, 513, 516, 500, 558, 555, 542, 194; 386/48; 375/362

See application file for complete search history.

(56) References Cited

U.S. PATENT DOCUMENTS

| | | | |
|---|---|---|---|
| 5,341,173 A | 8/1994 | Hyeon | |
| 5,400,148 A | 3/1995 | Kashida et al. | |
| 5,432,559 A | 7/1995 | Bruins et al. | |
| 5,486,869 A * | 1/1996 | Cooper | 348/525 |
| 5,754,250 A * | 5/1998 | Cooper | 348/525 |
| 6,154,256 A | 11/2000 | Bruins | |
| 6,424,379 B1 * | 7/2002 | Itabisashi | 348/525 |
| 6,573,944 B1 * | 6/2003 | Altmanshofer et al. | 348/542 |
| 7,352,406 B2 * | 4/2008 | Gurley et al. | 348/528 |
| 7,423,694 B2 * | 9/2008 | Wei et al. | 348/525 |

OTHER PUBLICATIONS

International Search Report for PCT/US06/36113, dated Apr. 16, 2007, 3 pages.
Written Opinion for PCT/US06/36113, dated Apr. 16, 2007, 3 pages.

\* cited by examiner

*Primary Examiner*—David L Ometz
*Assistant Examiner*—Jean W Désir
(74) *Attorney, Agent, or Firm*—Vedder Price P.C.

(57) ABSTRACT

A video synchronization signal detector for detecting occurrences of single and double frequency synchronization signal pulses present during a vertical synchronization interval.

5 Claims, 4 Drawing Sheets

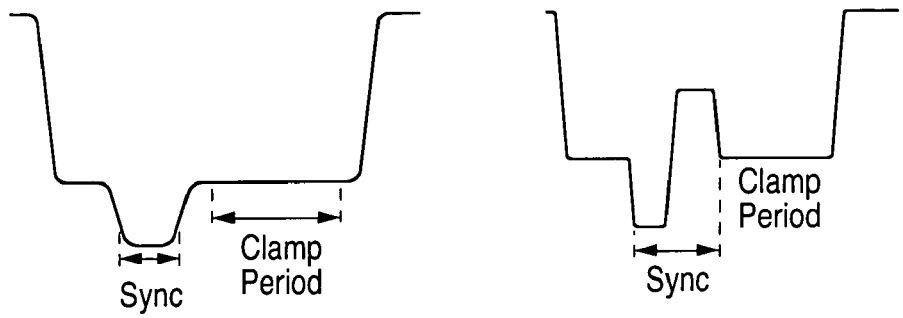
FIG. 1
(PRIOR ART)
FIG. 5
(PRIOR ART)
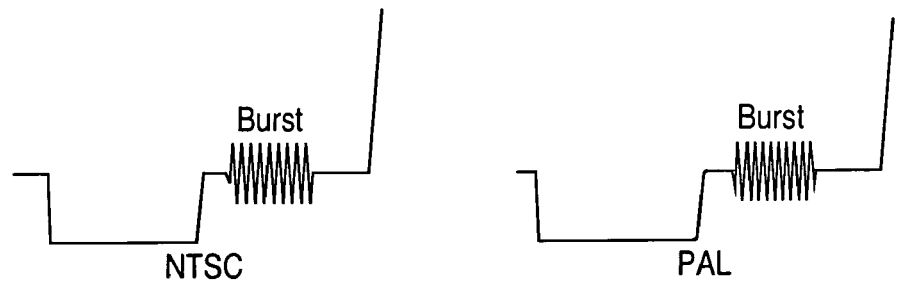
FIG. 3A
(PRIOR ART)
FIG. 3B
(PRIOR ART)
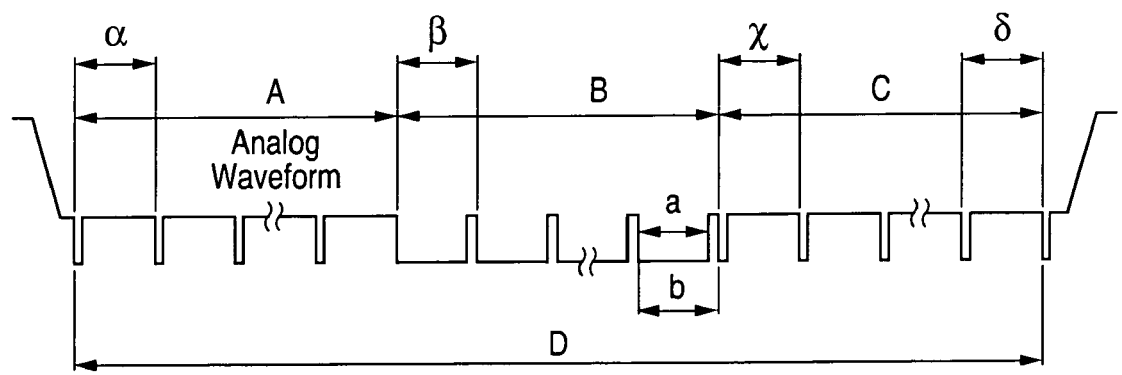
FIG. 4
(PRIOR ART)

| | |
|---|---|
| NTSC/PAL/SECAM | 63.5555 ~ 64μs |
| 480i | 63.556 μs |
| 480p | 31.776 μs |
| 720p60/720p59 | 22.222/22.244 μs |
| 1080i30/1080i29 | 29.630/29.659 μs |
| VESA monitor 1920x1440 at 75Hz | 8.889 μs |

| | NTSC/PAL/SECAM | 480i | 480p | 720p | 1080i |
|---|---|---|---|---|---|
| NTSC/PAL/SECAM/480i-flag | 1 | 1 | 0 | 0 | 0 |
| Interface-flag | 1 | 1 | 0 | 0 | 1 |
| HD-Burst-flag | 1 | 0 | 0 | 1 | 1 |

VIDEO SYNCHRONIZATION SIGNAL DETECTION CIRCUIT

BACKGROUND OF THE INVENTION

1. Field of the Invention

The present invention relates to video signal processing circuits, and in particular, to video signal processing circuits capable of processing multiple types of video signals.

2. Description of the Related Art

Increasingly, computer monitors and televisions receive, process and display images provided in the form of multiple types of video signals, including component video signals as well as the well-known NTSC, PAL and SECAM video signals. Accordingly, it has become increasingly desirable for the video processing circuits to be capable of detecting and correctly processing each type of video signal with little or no direction from the user or viewer.

SUMMARY OF THE INVENTION

In accordance with the presently claimed invention, a video synchronization signal detector is provided for detecting occurrences of single and double frequency synchronization signal pulses present during a vertical synchronization interval.

In accordance with one embodiment of the presently claimed invention, a video synchronization signal detector for detecting occurrences of single and double frequency synchronization signal pulses present during a vertical synchronization interval includes voltage generating circuitry, voltage detection circuitry and control circuitry. The voltage generating circuitry is responsive to a control signal by providing a generated voltage that alternately charges and discharges to first and second values during first and second states of the reset control signal, respectively. The voltage detection circuitry is coupled to the voltage generating circuitry and responsive to the generated voltage by providing a reference voltage corresponding to a maximum value of the first generated voltage value attained during one or more earlier ones of the first reset control signal state. The control circuitry is coupled to the voltage detection circuitry and the voltage generating circuitry, and responsive to at least the generated voltage, the reference voltage and a horizontal synchronization signal with first and second signal states and one or both of single and double frequency synchronization signal pulses during a vertical synchronization interval, by providing: the control signal in the first and second states in response to the first and second horizontal synchronization signal states, respectively; and one or more video mode signals indicative of the single frequency synchronization signal pulses in response to the value of the first generated voltage value attained during one or more later ones of the first reset control signal state being substantially equal to the maximum first generated voltage value, and indicative of the double frequency synchronization signal pulses in response to the value of the first generated voltage value attained during one or more later ones of the first reset control signal state being approximately half of the maximum first generated voltage value.

In accordance with another embodiment of the presently claimed invention, a video synchronization signal detector for detecting occurrences of single and double frequency synchronization signal pulses present during a vertical synchronization interval includes voltage generator means, voltage detector means and controller means. The voltage generator means is for receiving a control signal and in response thereto generating a voltage that alternately charges and discharges to first and second values during first and second states of the reset control signal, respectively. The voltage detector means is for receiving the generated voltage and in response thereto providing a reference voltage corresponding to a maximum value of the first generated voltage value attained during one or more earlier ones of the first reset control signal state. The controller means is for receiving at least the generated voltage, the reference voltage and a horizontal synchronization signal with first and second signal states and one or both of single and double frequency synchronization signal pulses during a vertical synchronization interval, and in response thereto providing: the control signal in the first and second states in response to the first and second horizontal synchronization signal states, respectively; and one or more video mode signals indicative of the single frequency synchronization signal pulses in response to the value of the first generated voltage value attained during one or more later ones of the first reset control signal state being substantially equal to the maximum first generated voltage value, and indicative of the double frequency synchronization signal pulses in response to the value of the first generated voltage value attained during one or more later ones of the first reset control signal state being approximately half of the maximum first generated voltage value.

BRIEF DESCRIPTION OF the DRAWINGS

FIG. 1 is a signal diagram for a standard synchronization signal tip.

FIGS. 3A and 3B illustrate the location of the burst signals for NTSC and PAL video signals.

FIG. 4 is a signal diagram of a vertical blanking interval for a progressive video signal.

FIG. 5 is a signal diagram of the tri-level synchronization signal tips for a high definition ("HD") video signal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 2:
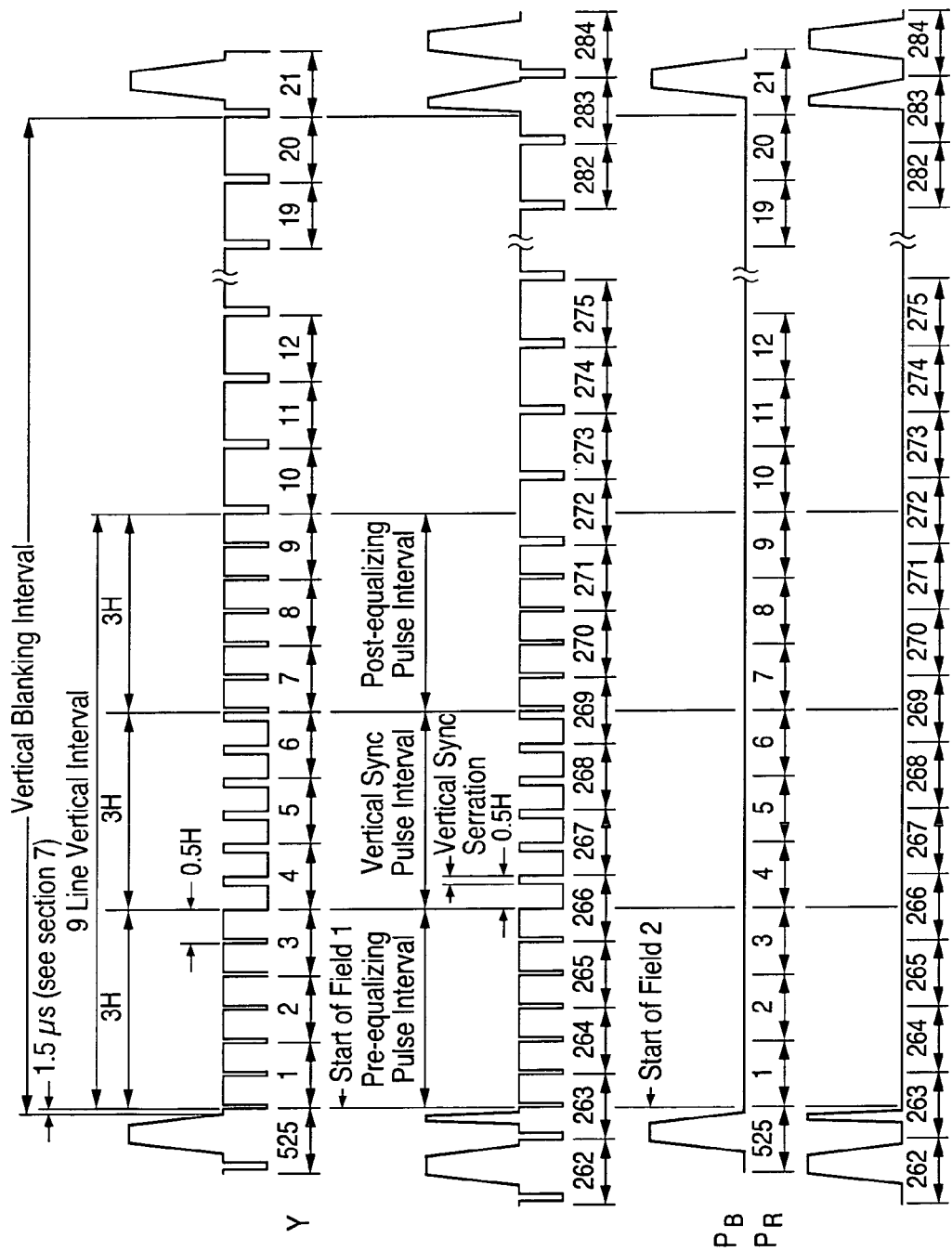
FIG. 2 is a signal diagram for the vertical blanking interval of an interlaced video signal.

Referring to FIGS. 1 and 2, the horizontal synchronization signal for 480-line interlaced scan ("480i") video signals include negative synchronization signal tips, as shown. The frequency of these synchronization signals is doubled during the first nine lines of the vertical blanking interval.

Referring to FIGS. 3A and 3B, the synchronization signals for NTSC and PAL video signals are similar to the synchronization signals in the luminance Y component of the 480i signal (FIG. 2). However, NTSC and PAL synchronization signals also include burst signals following the synchronization tips and within the clamp period.

Referring to FIG. 4, the synchronization tips in a 480-line progressive scan ("480p") video signal are similar to those of the 480i signal. However, the synchronization signal frequency is not doubled during the vertical blanking interval.

Referring to FIG. 5, the synchronization signal tips in HD signals, e.g., 720-line progressive scan ("720p") and 1080-line interlaced scan ("1080i") signals, include three levels. For 720p signals there is no double frequency synchronization tips during the vertical blanking interval, while for 1080i signals, the vertical blanking interval does include double frequency synchronization signal tips.

Figures 6, 7, 8:
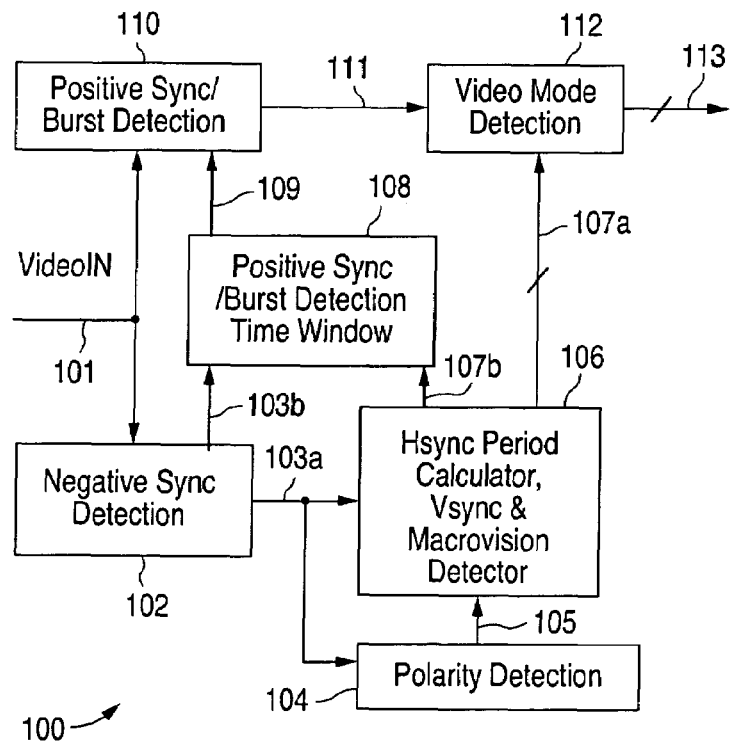
FIG. 6 is a table of the nominal line periods for various video signal standards.
FIG. 7 is a block diagram of a system providing video mode detection in accordance with one embodiment of the presently claimed invention.
FIG. 8 is a table of video mode flags generated by the circuit of FIG. 7.

Referring to FIG. 6, the nominal line periods for these various video signal standards, as well as those for a VESA monitor with a display 1920 pixels wide, 1440 lines high and refreshing at 75 Hertz, are as shown.

Referring to FIG. 7, a video mode detection system for detecting the mode of the incoming video signal in accordance with one embodiment of the presently claimed invention includes a synchronization detection circuit 102, a polarity detection circuit 104, a synchronization interval computation circuit 106, a timing control circuit 108, a burst detection circuit 110, and a mode detection or decoding circuit 112, interconnected substantially as shown. The incoming video signal 101 is processed by the synchronization detection circuit 102 to detect the negative synchronization signal tips. Signals 103a, 103b are indicative of these negative synchronization signal tips and are provided to the synchronization interval computation circuit 106, the polarity detection circuit 104 and the timing controller 108.

In response to this signal 103a indicating detection of the negative synchronization signal tip, the polarity detection circuit 104 (discussed in more detail below) detects the negative synchronization signal polarity during the vertical synchronization signal pulse interval (FIG. 2) and generates a synchronization signal 105 for the synchronization interval computation circuit 106. This signal 105 is similar to a vertical synchronization signal in that it is indicative of the vertical synchronization interval within the incoming video signal 101.

The synchronization interval computation circuit 106 (discussed in more detail below) computes the line period (i.e., the maximum synchronization signal pulse interval) for each video frame. When the detected line period is significantly longer than that of a 480p signal (31.776 microseconds per FIG. 6), the mode detection signal 107a indicates the setting of a flag identifying the signal as either an NTSC signal, a PAL signal, a SECAM signal or a 480i signal. When the synchronization pulse period is half of the line period, the mode signal 107a indicates the setting of a flag identifying the incoming video signal 101 as an interlaced signal. If the synchronization signal tip frequency is less than half of the line period, it is then known that Macrovision is active. (Macrovision is a registered trademark of Macrovision Corporation and identifies a copy protection system for video signals.) If Macrovision is not active, and the vertical blanking interval is also not active, an enablement signal 107b provided to the timing control circuit 108 is asserted.

Assertion of the enablement signal 107b allows the timing control circuit 108 to create a time window immediately following the negative synchronization signal tips, as determined by the synchronization detection signal 103b. This time window is identified by assertion of the timing control signal 109 provided to the burst detection circuit 110.

During assertion of the timing control signal 109, the burst detection circuit 110 monitors the synchronization signal following the negative synchronization signal tips, e.g., during the clamping interval (FIG. 1). During this time window, if the video signal is above the black level, e.g., during the positive synchronization signal tip of the HD signal (FIG. 5) or during the burst signal (FIGS. 3A and 3B), the detection signal 111 identifies the setting of a flag indicating the presence of either an HD signal or a burst signal.

Referring to FIG. 8, the mode detection circuit 112 decodes the mode signals 107a, 111 to determine the type of incoming video signal 101. For example, if the first mode signal 107a indicates that the flag representing the presence of an NTSC, PAL, SECAM or 480i signal is not set ("0") and the flag corresponding to an interlace signal is set ("1"), and the second mode signal 111 indicates that a flag corresponding to the presence of an HD or a burst signal is also set ("1"), then the output mode signal 113 identifies the input video signal 101 as a 1080i signal.

Figure 9:
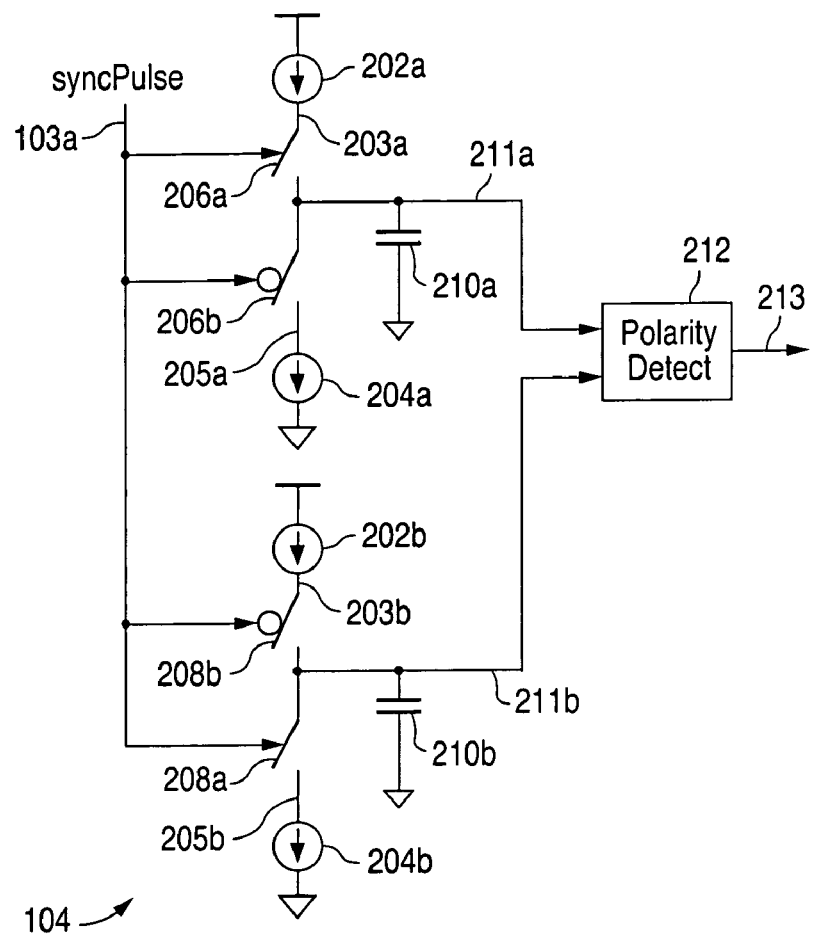
FIG. 9 is a block diagram of the polarity detection circuit of FIG. 7.

Referring to FIG. 9, in accordance with a preferred embodiment of the presently claimed invention, the polarity detection circuit 104 includes complementary voltage generating circuits and a detection circuit 212. Each of the voltage generating circuits includes a current sourcing circuit 202, a current sinking circuit 204, switching circuits 206 and a capacitive circuit element 210. During the asserted, or high, state of the synchronization signal 103a, switches 206a and 208a are closed and switches 206b and 208b are open, thereby causing voltages 211a and 211b across capacitances 210a and 210b, respectively, to charge in mutually opposing directions. Conversely, during the de-asserted, or low, state of the synchronization signal 103a, switches 206a and 208a are open and switches 206b and 208b are closed, thereby causing voltages 211a and 211b across capacitances 210a and 210b, respectively, to charge in opposite mutually opposing directions. Hence, during the asserted state of the synchronization signal 103a, voltage 211a will charge in a positive direction, while voltage 211b will discharge, or charge in a negative direction. The detection circuit 212 detects the relative polarity of the difference between these two voltages 211a, 211b to provide a signal 213 indicating whether the input synchronization signal 103a is positive or negative during most of its signal period.

For example, the line synchronizing pulse for a PAL signal has an interval of 4.99+/−0.77 microseconds. In a VESA monitor, the horizontal synchronization pulse has an interval of 0.754 microsecond, while the non-horizontal synchronization pulse has an interval of 8.135 microseconds. Using a conventional technique, a fixed current is used to charge a capacitance during the synchronization pulse interval, with the resulting voltage across such capacitance compared to a reference voltage. With a voltage charging time threshold of 6.95 microseconds, i.e., (4.99+/−0.77+8.135)/2, such a technique will work for both PAL and VESA signals. However, typical circuit error tolerances are +/−15%, similar to typical variations in the processes used to manufacture the capacitance in an integrated circuit. Additionally, there is the tolerance of the voltage reference, e.g., a bandgap voltage reference, to consider which also affects the accuracy of the integration current. The circuitry of FIG. 9 overcomes these limitations through the use of the two integration circuits, as discussed above. With such a circuit implementation, one capacitance charges while the other capacitance discharges. Hence, any process variations affecting the two capacitances will tend to cancel each other.

Figure 10:
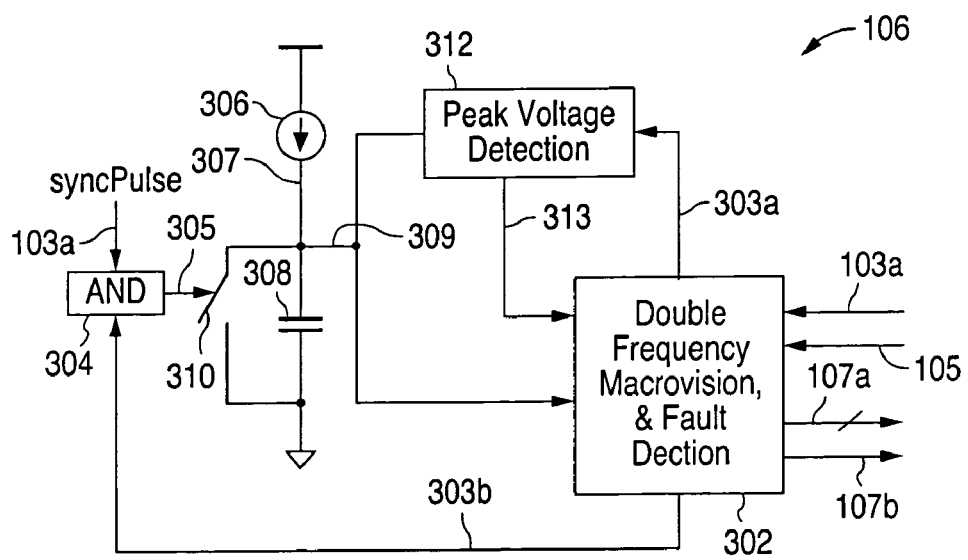
FIG. 10 is a block diagram of the computation circuit of FIG. 7.

Referring to FIG. 10, the synchronization interval computation circuit 106 can be implemented using voltage generating, detection and control circuitry, substantially as shown. The control circuitry includes a processing stage 302 (discussed in more detail below) and logic circuitry 304 providing a gating, e.g., a logical AND, function. The voltage generating circuitry includes a current source 306, a capacitance 308, and a switch 310. The voltage detection circuitry 312 interacts with the control circuitry 302 and voltage generating circuitry.

The processing circuit 302 receives the horizontal synchronization signal 103a from the detection circuit 102 (FIG. 7) and the vertical synchronization signal 105 from the polarity detection circuit 104. The switch circuit 310 is normally open. Between synchronization pulses, the capacitance 308 is charged with the constant current 307 provided by the current source 306. The voltage 309 across the capacitance 308 is monitored by the voltage detection circuit 312, which records the maximum magnitude attained by this voltage 309. This maximum voltage is provided as a signal 313 to the processing circuit 302 which compares the charging voltage 309 across the capacitance 308 against this voltage 313. The line period, i.e., the maximum synchronization signal pulse period, for each frame is based on this maximum voltage 313. If the voltage 309 across the capacitance 308 is close to this maximum voltage 313, within a reasonable error tolerance, it is determined that a single frequency synchronization pulse is occurring. If the capacitance 309 is determined to be approximately half of the maximum voltage 313, it is determined that a double frequency synchronization pulse is occurring. If synchronization pulses at other frequencies are detected, however, it is then determined that Macrovision is active. The processing circuit 302 asserts an enablement signal 303b to the gating circuit 304, thereby allowing the incoming synchronization signal 103a to reset the voltage integrator by asserting a control signal 305 to close the switch 310, thereby discharging the capacitance 308. Following termination of the double frequency synchronization pulses, it is known that the vertical synchronization interval has passed, and the voltage detection circuit 312 and processing circuit 302 are reset to repeat the process just described. If the number of high frequency synchronization signal tips between two such resets is deemed too high, a global reset can be generated to reset all circuit stages within the system 100 (FIG. 7). The resetting of the processing circuit 302 is accomplished internally, while the control signal 303a to the voltage detection circuit 312 accomplishes the reset of the peak voltage detection circuit 312.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a video synchronization signal detector for detecting occurrences of single and double frequency synchronization signal pulses present during a vertical synchronization interval, comprising:

voltage generating circuitry responsive to a reset control signal by providing a generated voltage that alternately charges and discharges to first and second values during first and second states of said reset control signal, respectively;

voltage detection circuitry coupled to said voltage generating circuitry and responsive to said generated voltage by providing a reference voltage corresponding to a maximum value of said first generated voltage value attained during one or more earlier ones of said first reset control signal state; and control circuitry coupled to said voltage detection circuitry and said voltage generating circuitry, and responsive to at least said generated voltage, said reference voltage and a horizontal synchronization signal with first and second signal states and one or both of single and double frequency synchronization signal pulses during a vertical synchronization interval, by providing said reset control signal in said first and second states in response to said first and second horizontal synchronization signal states, respectively, and one or more video mode signals indicative of said single frequency synchronization signal pulses in response to said value of said first generated voltage value attained during one or more later ones of said first reset control signal state being substantially equal to said maximum first generated voltage value, and said double frequency synchronization signal pulses in response to said value of said first generated voltage value attained during one or more later ones of said first reset control signal state being approximately half of said maximum first generated voltage value.

2. The apparatus of claim 1, wherein said voltage generating circuitry comprises:

current source circuitry to provide a source current;

capacitive circuitry coupled to said current source circuitry and responsive to said by providing said generated voltage; and switching circuitry coupled to said capacitive circuitry and responsive to said first and second reset control signal states by charging and discharging said generated voltage to said first and second values, respectively.

3. The apparatus of claim 1, wherein said voltage detection circuitry comprises sample-and-hold circuitry.

4. The apparatus of claim 1, wherein said control circuitry comprises voltage comparison circuitry.

5. An apparatus including a video synchronization signal detector for detecting occurrences of single and double frequency synchronization signal pulses present during a vertical synchronization interval, comprising:

voltage generator means for receiving a reset control signal and in response thereto generating a voltage that alternately charges and discharges to first and second values during first and second states of said reset control signal, respectively;

voltage detector means for receiving said generated voltage and in response thereto providing a reference voltage corresponding to a maximum value of said first generated voltage value attained during one or more earlier ones of said first reset control signal state; and controller means for receiving at least said generated voltage, said reference voltage and a horizontal synchronization signal with first and second signal states and one or both of single and double frequency synchronization signal pulses during a vertical synchronization interval, and in response thereto providing said reset control signal in said first and second states in response to said first and second horizontal synchronization signal states, respectively, and one or more video mode signals indicative of said single frequency synchronization signal pulses in response to said value of said first generated voltage value attained during one or more later ones of said first reset control signal state being substantially equal to said maximum first generated voltage value, and said double frequency synchronization signal pulses in response to said value of said first generated voltage value attained during one or more later ones of said first reset control signal state being approximately half of said maximum first generated voltage value.

* * * * *